(No Model.)
G. W. BOOTH & G. W. DAWSON.
CHICKEN COOP.
No. 390,557. Patented Oct. 2, 1888.
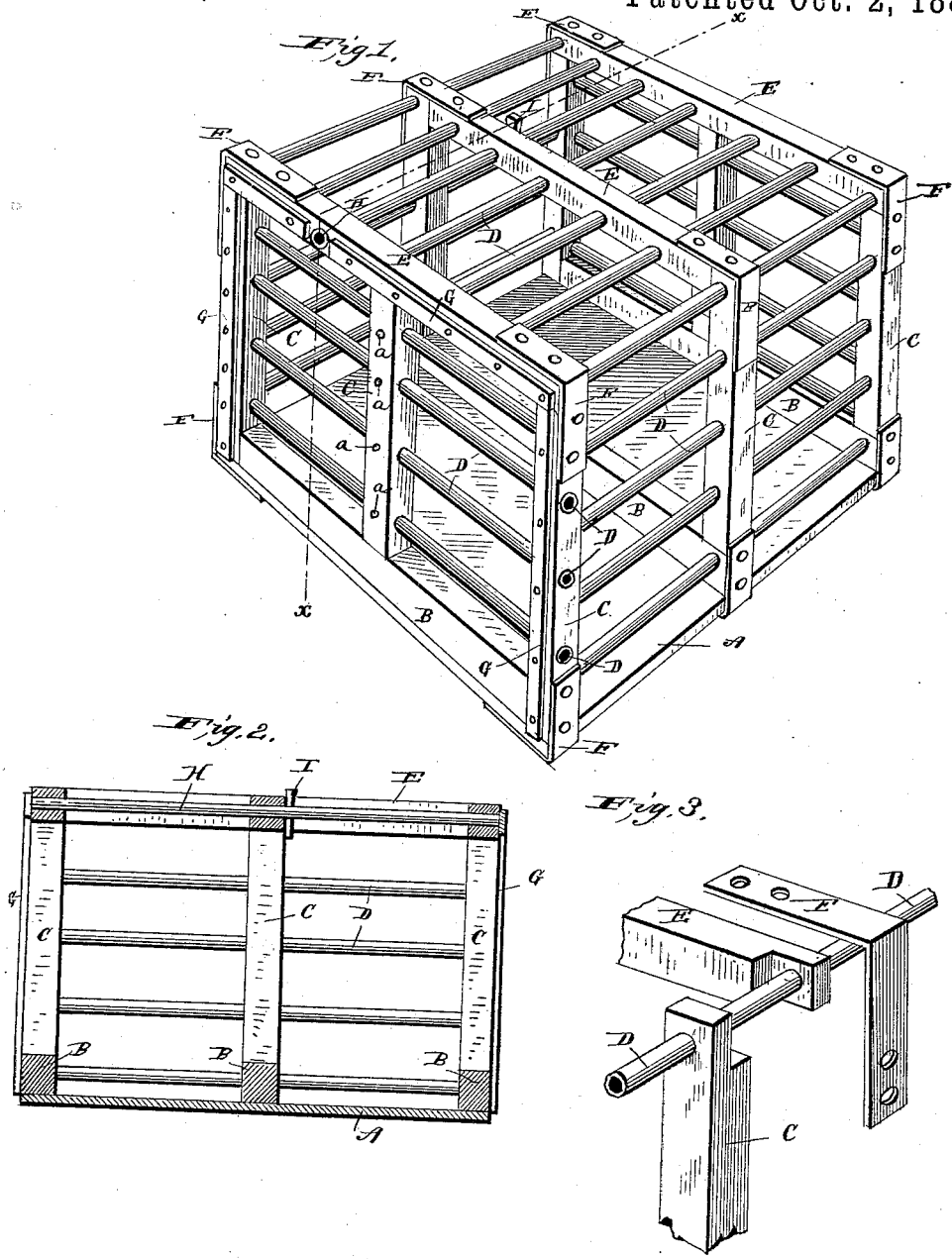
WITNESSES
INVENTORS:
G. W. Booth & G. W. Dawson
By C. M. Alexander
*Attorney*

UNITED STATES PATENT OFFICE.

GEORGE W. BOOTH AND GEORGE W. DAWSON, OF GUNTOWN, MISSISSIPPI.

CHICKEN-COOP.

SPECIFICATION forming part of Letters Patent No. 390,557, dated October 2, 1888.

Application filed August 9, 1888. Serial No. 282,297. (No model.)

*To all whom it may concern:*

Be it known that we, GEORGE W. BOOTH and GEORGE W. DAWSON, citizens of the United States, residing at Guntown, in the county of Lee and State of Mississippi, have invented certain new and useful Improvements in Chicken-Coops, of which the following is a specification, reference being had therein to the accompanying drawings.

This invention has for its objects to provide a light, strong, and compact coop or cage for poultry and other small live stock, being specially designed for transportation purposes, although it is applicable to general purposes.

The above-mentioned objects are accomplished by the means illustrated in the accompanying drawings, in which—

Figure 1 represents a perspective view of a coop or cage constructed according to my invention. Fig. 2 represents a sectional view of the same, taken on the line $x\,x$ of Fig. 1; and Fig. 3, a detached perspective view, in detail, showing the means of connecting the parts of the coop or cage at the joints.

Referring to the drawings, the letter A indicates the base or floor of the coop or cage, which is preferably constructed of solid timber, which is braced by cross sills B on its upper surface, upon which the upright timbers C are erected. The sills B at their ends and midway between the same are rabbeted, and the lower ends of the timbers C are similarly rabbeted, so as to make a lock-joint at their points of connection. The adjoining lips of the rabbeted portions of the sills and timbers are bored transversely in a direct line, the lower bars D of the cage being passed through the recesses, so as to securely fasten the parts at their lower joints. The upper ends of the upright timbers are similarly rabbeted, and to the said ends are fitted the rabbeted ends of the cross timbers E, which are also bored, as before mentioned, and fastened by the upper bars D of the cage. The joints of the respective parts of the cage are braced on the outside by means of the flat angle-irons F, which are secured by means of nails or otherwise at suitable intervals. The upright and cross timbers are bored for the reception of the intermediate bars of the cage.

The bars D are constructed of reed or cane, and their ends are confined in the outer timbers by means of the flat wooden or metallic strips G, which are nailed or otherwise fastened to said timbers, with the exception of one point at the end of one of the bars, which is left free, as indicated by the letter H, so that said bar may be withdrawn and replaced to admit and secure the stock or remove the same. The removable bar, at a point adjacent to the central cross-bar, is provided with a tapering aperture to receive a wedge or pin, I, by means of which said bar may be locked in place. The bars D may be held in place by nails or pins $a$ driven into the uprights C, as shown on the left hand side of Fig. 1, instead of or in addition to being held in place by means of the end strips, G.

It will be evident that as the bars are constructed of reed or cane, which is hollow, an extremely light and strong cage is secured, and as these bars are confined wholly by the strips secured over their ends they will not be weakened or injured by nails or other similar devices passing through them. Moreover, the reeds or canes being naturally of the proper shape can be fitted in the cage without previous working or dressing, enabling the cage to be constructed at little expense.

Having thus described our invention, what we claim, and desire to secure by Letters Patent, is—

1. In a coop or cage for fowls or animals, the combination, with the lower sills and upper cross-timbers rabbeted at their ends, of the similarly-rabbeted upright timbers, the said sills and timbers having bore-holes through their adjoining lips, and the bars passing through the bore-holes, whereby the joints are securely locked, substantially as specified.

2. In a coop for fowls and animals, the combination of the floor A, the sills B, rabbeted at their ends, the vertical timbers C, and the upper cross-timbers, E, these timbers being also rabbeted at their ends, the said sills and timbers having bore-holes through their adjoining lips, the bars D, passing through these bore-holes, the angle-irons F, secured over the overlapped ends of the sills and timbers, and the flat strips G, secured over the ends of the said bars D to confine them in place, all arranged as herein shown and described.

In testimony whereof we affix our signatures in presence of two witnesses.

GEORGE W. BOOTH.
GEORGE W. DAWSON.

Witnesses:
H. D. KNIGHT,
W. C. HINDS.